Jan. 3, 1967     H. KUNTZE     3,295,244
FISHING ROD
Filed Feb. 1, 1965
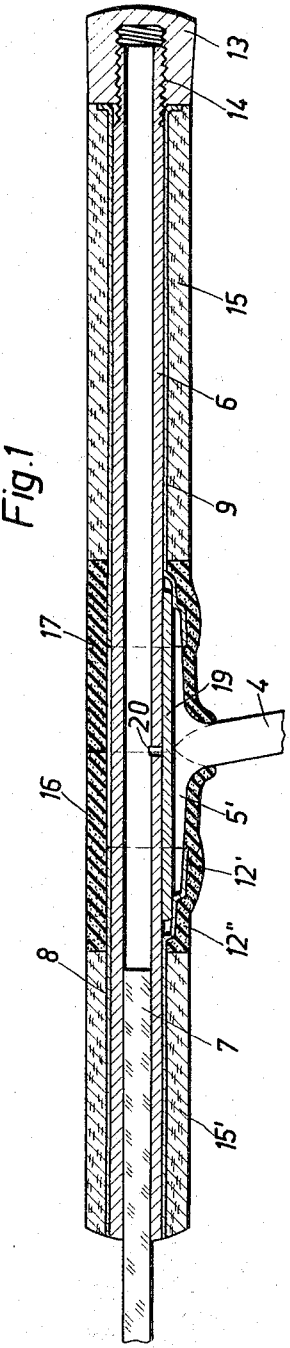
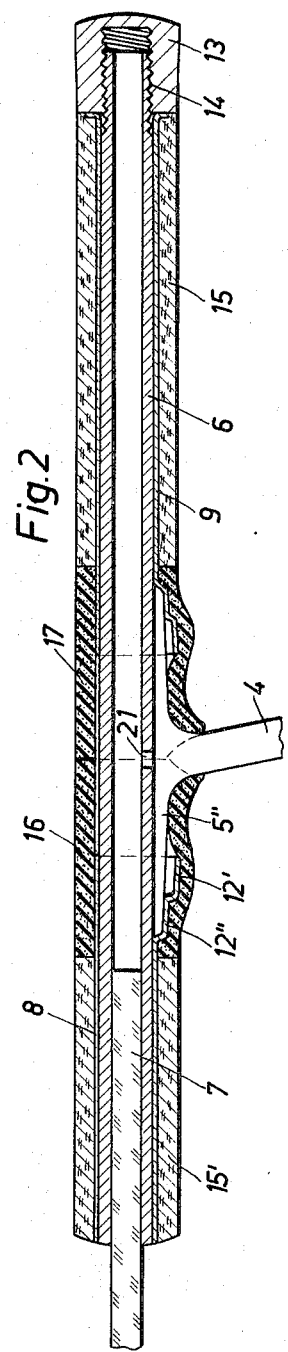
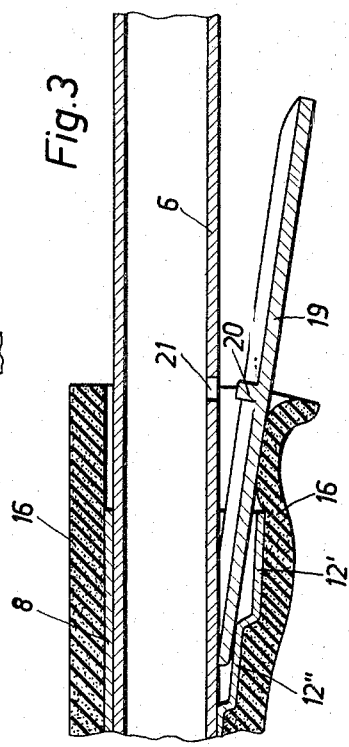
Inventor:
H. Kuntze
BY
Richards & Geier
ATTORNEYS

3,295,244
FISHING ROD
Hellmuth Kuntze, Berlin, Germany, assignor to Deutsche Angelgerate Manufaktur (DAM) Hellmuth Kuntze, Berlin, Germany, a firm of Germany
Filed Feb. 1, 1965, Ser. No. 429,236
Claims priority, application Germany, Jan. 31, 1964, D 43,486
2 Claims. (Cl. 43—22)

This invention relates to fishing rods and refers more particularly to the attachment of reels provided with T-shaped feet to the fishing rods.

A fishing rod having a stem is used in combination with a tubular piece for receiving said stem, a pair of sleeves mounted on said tubular piece and movable relatively to each other, a reel-carrying foot having two oppositely directed flanges, each of said sleeves having a shoe-like extension for enclosing said flanges, said sleeves being located on opposite sides of said foot, a pair of resilient tubular members enclosing the shoe-like extensions on said sleeves and engaging the stem of said foot and each other, hollow coverings enclosing each of said sleeves, and means urging the sleeves into engagement with said flanges and said hollow coverings into abutting contact with said resilient tubular members.

In this manner an attachment of the reel is provided having smooth surfaces adjacent the reel foot, as the reel foot is supported in the hand grip of the rod in a concealed manner, thereby greatly facilitating the handling of the fishing rod. Furthermore, this construction prevents the fingers from being subjected to unpleasant freezing sensation in winter.

However there are fishing reels on the market with supporting flanges of different length. This involves manufacturing several types of the attachment device to have a good correlation of the reel foot in question.

The object of the invention is the improvement of such attachments to enable the use of a single type for reel feet with supporting flanges of different length without disturbing the clamping action and the smooth surface of the hand grip.

According to the invention the shoe-like extensions of the sleeves are stepped, the steps adjacent the tubular piece being adapted to enclose longer supporting flanges, or alternatively, to receive an insert piece acting as a support for shorter supporting flanges which are enclosed by the other steps. Preferably said insert piece has a pin adapted to enter a cross bore in said tubular piece.

In this manner a positive clamping action is achieved with reel feet, the supporting flanges of which have different length according to the special type, whereby the contact of the form pieces surrounding the stem of the foot is secured due to the fact that the resilient tubular members are made from soft rubber. The hand grip is therefore closed in any case.

The invention will appear more clearly from the following detailed description when taken in connection with the accompanying drawings showing by way of example a preferred embodiment of the invention.

In the drawing:

FIG. 1 is a longitudinal section through the hand grip of a fishing rod provided with a reel attachment in accordance with the present invention in connection with a reel foot having short supporting flanges;

FIG. 2 is a longitudinal section through the hand grip according to FIG. 1 but in connection with a reel foot having long supporting flanges;

FIG. 3 is a longitudinal section through part of FIG. 1 in enlarged scale and demonstrating how the insert piece is inserted.

As shown in FIGS. 1 and 2 the stem 7 of a fishing rod is inserted into a tubular piece 6 on which are mounted sleeves 8 and 9 movable relatively to each other. Preferably the sleeve 8 is connected to the tubular piece 6. The position of the sleeves 8 and 9 to each other is determined by a screw cap 13 screwed onto the threaded end 14 of the tubular piece 6. The sleeve 8 is surrounded by a covering 15′ and a resilient tubular member 16 abutting each other, while sleeve 9 is surrounded by a covering 15 and a resilient tubular member 17 abutting each other. The coverings 15 and 15′ are made in the usual manner from cork, plastics or the like, while the members 16 and 17 are made preferably from soft rubber having recesses to surround the stem of the foot. The members 16 and 17 abut each other in the region of the stem 4 of the reel foot enclosing this stem. The reel foot has two oppositely directed supporting flanges 5′ (FIG. 1) or 5″ (FIG. 2).

The sleeves 8 and 9 are provided with stepped shoe-like extensions 12′ and 12″ which enclose in the clamping position the supporting flanges of the reel foot.

The steps 12″ adjacent the tubular piece 6 serve to receive supporting flanges 5″ of greater length as shown in FIG. 2, while the flanges are supported on tubular piece 6. The reel foot is clamped between the steps 12″ by screw cap 13 by which the coverings 15 and 15′ and the members 16 and 17 are brought into contact with each other also.

The other steps 12′ of the sleeves serve to receive supporting flanges 5′ of minor length (FIG. 1). In this case an insert piece 19 is inserted into the steps 12″, the insert piece 19 acting as a support for the flanges 5′ of minor length. The clamping of the reel foot is achieved in similar manner as already described and FIGS. 1 and 2 show that in any case a fully closed hand grip is achieved.

FIG. 3 shows the insertion of the insert piece 19 which is provided in its middle part with a pin 20. This pin 20 enters a cross bore 21 in the tubular piece 6 to locate the insert piece 19.

What is claimed is:

1. In a fishing rod having a stem, in combination, a tubular piece for receiving said stem, a pair of sleeves mounted on said tubular piece and movable relatively to each other, a reel-carrying foot having two oppositely directed flanges, each of said sleeves having a shoe-like extension for enclosing said flanges, said sleeves being located on opposite sides of said foot, a pair of resilient tubular members enclosing the shoe-like extensions on said sleeves and engaging the stem of said foot and each other, hollow coverings enclosing each of said sleeves, and means urging the sleeves into engagement with said flanges and urging said hollow coverings into abutting contact with said resilient members, the shoe-like extensions of the sleeves being stepped, the steps adjacent the tubular piece being adapted either to enclose longer supporting flanges or to receive an insert piece acting as support for shorter flanges which are enclosed by the other steps.

2. In a fishing rod having a stem, in combination, a tubular piece for receiving said stem, a pair of sleeves mounted on said tubular piece and movable relatively to each other, a reel-carrying foot having two oppositely directed flanges, each of said sleeves having a shoe-like extension for enclosing said flanges, said sleeves being located on opposite sides of said foot, a pair of resilient tubular members enclosing the shoe-like extensions on said sleeves and engaging the stem of said foot and each other, hollow coverings enclosing each of said sleeves, and means urging the sleeves into engagement with said flanges and urging said hollow coverings into abutting contact with said resilient members, the shoe-like extensions of the sleeves being stepped, the steps adjacent the tubular piece being adapted either to enclose longer supporting flanges or to receive an insert piece acting as support for shorter flanges which are enclosed by the other steps, said insert piece having a pin adapted to enter a cross bore in said tubular piece.

No references cited.

SAMUEL KOREN, *Primary Examiner.*

D. J. LEACH, *Assistant Examiner.*